(12) United States Patent
Sugiyama et al.

(10) Patent No.: US 7,981,449 B2
(45) Date of Patent: Jul. 19, 2011

(54) PRODUCTION PROCESS OF PURIFIED GREEN TEA EXTRACT

(75) Inventors: Yukiteru Sugiyama, Kamisu (JP); Hideaki Ueoka, Kamisu (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/434,069

(22) Filed: May 16, 2006

(65) Prior Publication Data

US 2006/0263454 A1 Nov. 23, 2006

(30) Foreign Application Priority Data

May 20, 2005 (JP) ................. 2005-148248
Aug. 3, 2005 (JP) ................. 2005-225310
Jan. 30, 2006 (JP) ................. 2006-021441

(51) Int. Cl.
*A61K 36/82* (2006.01)
*A61K 31/353* (2006.01)
*A61K 36/00* (2006.01)
*A23F 3/00* (2006.01)

(52) U.S. Cl. .................. 424/729; 424/725; 426/597

(58) Field of Classification Search .................. None
See application file for complete search history.

(56) References Cited

U.S. PATENT DOCUMENTS

| | | | | |
|---|---|---|---|---|
| 4,944,879 A | * | 7/1990 | Steuck | 210/500.27 |
| 5,258,188 A | * | 11/1993 | Barmentlo et al. | 426/52 |
| 5,456,843 A | * | 10/1995 | Koenhen | 210/651 |
| 5,879,733 A | * | 3/1999 | Ekanayake et al. | 426/271 |
| 2002/0122857 A1 | * | 9/2002 | Asai et al. | 426/430 |
| 2005/0095343 A1 | * | 5/2005 | Ogura et al. | 426/597 |
| 2005/0176939 A1 | * | 8/2005 | Bazinet et al. | 536/8 |
| 2006/0057261 A1 | | 3/2006 | Ogura et al. | |

FOREIGN PATENT DOCUMENTS

| | | |
|---|---|---|
| JP | A-02-6499 | 1/1990 |
| JP | A 02-128650 | 5/1990 |
| JP | A 03-201945 | 3/1991 |
| JP | 06-116258 | 4/1994 |
| JP | A-07-70105 | 3/1995 |
| JP | A 10290660 | 4/1998 |
| JP | A 2004-222719 | 8/2004 |
| JP | A 2005-040030 | 2/2005 |

OTHER PUBLICATIONS

Xu et al, Application of ultrafiltration technology in tea drink, Shipin Gongye Keji (2000), 21 (4), 43-45.*
Membrane Technology, accessed on Sep. 2, 2010, pp. 1-2.*
Japanese Patent Office Submission of Publication by Third Party in JP 2006-021441 (with full English language translation).
Japanese Patent Office Citation, Technology of Food Membrane, The Manual of Membrane Technology, Korin Co., Ltd., Haruhiko Ohya and Atsuo Watanabe, 2006.
Technology of Food Membrane, The Manual of Membrane Technology, Korin Co., Ltd., Haruhiko Ohya et al., Sep. 30, 1999, pp. 484-488 (Previously submitted to the U.S. Patent and Trademark Office on Dec. 31, 2007.

* cited by examiner

*Primary Examiner* — Qiuwen Mi
(74) *Attorney, Agent, or Firm* — Oblon, Spivak, McClelland, Maier & Neustadt, L.L.P.

(57) ABSTRACT

Provided is a process for producing a purified green tea extract of high quality by readily and efficiently purifying a green tea extract in a simple manner. A process for producing a purified product of green tea extract, which includes subjecting an aqueous solution of green tea extract to solid-liquid separation by filtration and/or centrifugal separation to obtain another aqueous solution of green tea extract, said another aqueous solution having a turbidity of from 0.2 to 2.0 as measured with a concentration of non-polymer catechins in it adjusted to 1 wt %, and then allowing the another aqueous solution of green tea extract to pass through a polymer membrane having a membrane pore size of from 0.05 to 0.8 μm such that the turbidity of the another aqueous solution of green tea extract is reduced to lower than 0.2 as measured with a concentration of non-polymer catechins in it adjusted to 1 wt %.

14 Claims, No Drawings

US 7,981,449 B2

PRODUCTION PROCESS OF PURIFIED GREEN TEA EXTRACT

FIELD OF THE INVENTION

This invention relates to a process for producing a purified product of green tea extract, wherein said purified product can be obtained by selectively and efficiently removing impurities from an aqueous solution of green tea extract and contains non-polymer catechins at high concentration.

BACKGROUND OF THE INVENTION

As an example of the processes for producing a highly-purified polyphenol product, it is known to charge a tea extract solution into a chromatographic column and then obtain its fractionation by focusing on the finding that an advance elimination of impurities from the tea extract makes it possible to isolate and purify tea catechins into individual tea catechins such as ester catechins and free catechins (Patent Document 1).

Another known process is to filter a tea extract through an ultrafiltration membrane the molecular weight cutoff of which is from 6,000 to 100,000 (Patent Document 2). This process is, however, accompanied by a problem in that due to the use of a membrane of micropore size, the passing property is so bad that its processing time could extremely increase, even though improvements may be observed in clarity and catechin purity.

It is also known that tea-leaf catechins of low caffeine content can be obtained when a tea extract is filtered through a combination of a ceramic membrane, ultrafiltration membrane and reverse osmosis membrane (Patent Document 3). This process, too, has a problem in that due to the use of the ceramic membrane, the membrane is thick and is poor in passing property and processing time and further, its non-uniform pore size results in somewhat inferior clarity, although the ceramic membrane is good in durability and high-pressure operability.

[Patent Document 1] JP-A-07-70105
[Patent Document 2] JP-A-02-6499
[Patent Document 3] JP-A-06-116258

DISCLOSURE OF THE INVENTION

The present invention provides a process for producing a purified product of green tea extract, which includes allowing an aqueous solution of green tea extract to pass through a polymer membrane selected from a polymer hydrocarbon membrane, polymer fluorocarbon membrane or polymer sulfone membrane having a membrane pore size of from 0.05 to 0.8 µm.

The present invention also provides a process for producing a purified product of green tea extract, which includes subjecting an aqueous solution of green tea extract to solid-liquid separation by filtration and/or centrifugal separation to obtain another aqueous solution of green tea extract, said another aqueous solution having a turbidity of from 0.2 to 2.0 as measured with a concentration of non-polymer catechins therein adjusted to 1 wt %, and then allowing the another aqueous solution of green tea extract to pass through a polymer membrane having a membrane pore size of from 0.05 to 0.8 µm such that the turbidity of the another aqueous solution of green tea extract is reduced to lower than 0.2 as measured with a concentration of non-polymer catechins therein adjusted to 1 wt %.

The present invention further provides a production process of a purified green tea extract, which includes further dispersing the green tea extract, which has been purified by passage through the polymer membrane, in a mixed solution of an organic solvent and water, and then subjecting the resulting dispersion to treatment in contact with activated carbon and/or acid clay or activated clay.

The present invention still further provides a purified green tea extract obtained by the above-described production process, wherein a content of non-polymer catechins in solids thereof is from 35 to 90 wt %, and a weight ratio ((A)/(B)) of (A) the non-polymer catechins to caffeine (B) is from 4 to 200, and also a packaged beverage containing the purified green tea extract.

The present invention yet further provides a process for stabilizing an aqueous solution of green tea extract, which includes subjecting the aqueous solution of green tea extract to solid-liquid separation by filtration and/or centrifugal separation to obtain another aqueous solution of green tea extract, said another aqueous solution having a turbidity of from 0.2 to 2.0 as measured with a concentration of non-polymer catechins therein adjusted to 1 wt %, and then allowing the another aqueous solution of green tea extract to pass through a polymer membrane having a membrane pore size of from 0.05 to 0.8 µm such that the turbidity of the another aqueous solution of green tea extract is reduced to lower than 0.2 as measured with a concentration of non-polymer catechins therein adjusted to 1 wt %.

DETAILED DESCRIPTION OF THE INVENTION

The present invention provides a process for producing a purified green tea extract of high quality by readily and efficiently purifying a green tea extract in a simple manner.

The present inventors have found that the membrane filtration of an aqueous solution of green tea extract with a specific polymer membrane makes it possible to selectively, conveniently and efficiently eliminate impurities such as polymer substances or lipids and hence, to purify the aqueous solution of green tea extract into a high-quality purified product of green tea extract, said purified product being excellent in stability with time, and further that a purified high-quality green tea extract, which is low in the content of caffeine and has excellent stability with time despite the inclusion of non-polymer catechins at high concentration, can be obtained by dispersing the purified product in a mixed solution of an organic solvent and water and subjecting the resulting dispersion to treatment in contact with activated carbon and/or acid clay or activated clay.

According to the present invention, the filtration of an aqueous solution of green tea extract through a specific membrane makes it possible to selectively, readily and efficiently eliminate impurities such as water-soluble polymer substances or lipids and hence, to obtain a purified high-quality product (membrane filtration product) of green tea extract, and further, the control of the turbidity of an aqueous solution of green tea extract makes it possible to inhibit the growth of fungi and hence, to obtain a biologically-stable, purified green tea extract (membrane filtration product). In addition, when such a purified green tea extract is dispersed in a mixed solution of an organic solvent and water and is then subjected to treatment in contact with activated carbon and/or acid clay or activated clay, it is possible to obtain a purified green tea extract which despite the inclusion of non-polymer catechins at high concentration, is excellent in stability with time, has high quality and is low in the content of caffeine. Furthermore, a packaged beverage with the purified green tea extract contained therein is good in color, and remains stable while inhibiting the occurrence of turbidity over time.

Each green tea extract useful in the present invention contains one or more non-polymer catechins. The term "non-polymer catechins" as used herein is a generic term, which collectively encompasses non-epicatechins such as catechin, gallocatechin, catechingallate and gallocatechingallate, and epicatechins such as epicatechin, epigallocatechin, epicatechingallate and epigallocatechingallate.

The term "the content of gallates" as used herein means the percentage value of the weight sum of four gallates, which consist of catechingallate, gallocatechingallate, epicatechingallate and epigallocatechingallate, based on the weight sum of the eight non-polymer catechins.

As green tea extracts, extracts obtained from tea leaves such as green tea can be mentioned. In addition, mixtures of caffeine derived from caffeine-containing plants such as coffee with tea extracts are also usable. Tea leaves for use in the present invention include, more preferably tea leaves prepared from tea leaves of the Genus *Camellia*, for example, *C. sinensis*, *C. assamica* and the *Yabukita* variety, or their hybrids. Such prepared tea leaves include green teas such as *sencha* (middle-grade green tea), *bancha* (coarse green tea), *gyokuro* (shaded green tea), *tencha* (powdered tea) and *kamairicha* (roasted tea). As such green tea extracts with non-polymer catechins contained therein, those obtained by drying or concentrating extracts from green tea leaves are preferred.

The extraction from tea leaves can be conducted by stirring extraction or the like while using water as an extraction solvent. An organic acid salt such as sodium ascorbate or an organic acid salt can be added beforehand to water upon extraction. It is also possible to make combined use of boiling deaeration or an extraction method which is conducted while bubbling an inert gas such as nitrogen gas to eliminate dissolved oxygen, that is, under a so-called non-oxidizing atmosphere.

As an aqueous solution of green tea extract for use in the present invention, an extract of green tea leaves is used by optionally concentrating it as needed. When concentrated, the water content may be reduced to 1 wt % or lower. It is also possible to use a concentrate of green tea extract by dissolving or diluting it with water or to use an extract from tea leaves in combination with a concentrate of green tea extract.

The term "a concentrate of green tea extract" as used herein means one obtained by concentrating an extract of tea leaves in hot water or a water-soluble organic solvent, and includes, for example, those prepared by the processes disclosed in JP-A-59-219384, JP-A-04-20589, JP-A-05-260907, JP-A-05-306279 and the like. As a concentrate of green tea extract, specifically as a solid concentrate of green tea extract, it is possible to use a commercially-available crude catechin preparation such as "POLYPHENON" (product of Tokyo Food Techno Co., Ltd.), "TEAFURAN" (product of ITO EN, LTD.) or "SUNPHENON" (product of Taiyo Kagaku Co., Ltd.).

As an aqueous solution of green tea extract, it is also possible to use an extract obtained from tea leaves subjected beforehand to treatment in contact with carbon dioxide in its supercritical state. The tea leaves for use in critical extraction can be either raw tea leaves or prepared tea leaves insofar as they belong to the Genus *Camellia*. As the prepared tea leaves, non-fermented tea is more preferred. Preferred examples of steamed tea leaves include *sencha* (middle-grade green tea), *fukamushicha* (deep-steamed green tea), *gyokuro* (shaded green tea), *kabusecha* (partially shaded green tea), *mushi-tamaryokucha* (steamed, rounded, beads-shaped green tea), and *bancha* (coarse green tea). Preferred examples of roasted tea leaves, on the other hand, include *kamairi-tamaryokucha* (roasted, rounded, beads-shaped green tea) and Chinese green tea. As prepared tea leaves, steamed tea leaves or dipped tea leaves are preferred from the standpoint of avoiding the occurrence of an additional flavor derived from tea leaves during roasting. In this method, an extract with non-polymer catechins contained therein is obtained from tea leaves available as a residue from an application of supercritical extraction.

The use of an extract, which has been obtained by treating a green tea extract with tannase, as a green tea extract is more preferred, because a purified green tea extract pronouncedly reduced in bitterness and astringency can be obtained. Any tannase can be used in the above-described treatment insofar as it has activity to degrade non-polymer catechins. Preferably, tannase available from the cultivation of a tannase-producing fungus of the *Aspergillus* genus, the *Penicillium* genus, the *Rizopus* genus or the like is usable. Among these, tannase derived from *Aspergillus oryzae* is more preferred. Tannase is added in the form of a powder or solution to a green tea extract to give a concentration of from 25 Units/L to 500 Units/L, preferably from 50 Units/L to 150 Units/L. Such an added amount of tannase can be converted into 0.1 Unit or more, preferably 0.2 Unit or more per mg of solids. It is to be noted that 1 Unit is defined to be an amount of the enzyme required to hydrolyze 1 micromole of the ester bond, which is contained in tannic acid, in water of 30° C. Subsequently, the mixture is maintained at from 5° C. to 50° C., desirably from 10° C. to 40° C. until a gallate content of from 10 to 70 wt % is reached.

The temperature is then raised to 45° C. to 95° C., preferably 75° C. to 95° C. as promptly as possible so that tannase is inactivated to terminate the reaction. This inactivation treatment of tannase can prevent a subsequent reduction in the content of gallates so that a green tea extract with gallates contained at an intended content can be obtained.

In the tannase treatment in the present invention, the content of gallates in the non-polymer catechins in the resulting green tea extract is controlled to a range of from 10 to 70 wt %, preferably from 30 to 60 wt % from the standpoints of a reduction in bitterness and external appearance. Different from the conventional treatment method that gallates contained in polymer catechins are all hydrolyzed, the tannase treatment practiced in the present invention controls the content of gallates at the time of the tannase treatment. The control of the content of gallates by the tannase treatment can be achieved preferably by determining the end of the reaction in accordance with the pH behavior of green tea extract during its treatment. The pH may be preferably from 3 to 6, with a range of from 3.5 to 5.5 being more preferred. In this manner, it is possible to obtain a tannase-treated green tea extract the content of gallates in which is controlled within a desired range. Further, any subsequent reduction in the content of gallates can be prevented by the inactivation treatment of tannase after the tannase treatment.

It is preferred from the standpoint of productivity to conduct solid-liquid separation of an aqueous solution of green tea extract into a solid fraction and an aqueous liquid fraction by filtration and/or centrifugal separation processing before its filtration through a membrane, because the filtration rate can be improved in the filtration through the membrane. The turbidity of the aqueous solution of green tea extract obtained as the aqueous liquid fraction by the solid-liquid separation of the starting aqueous solution of green tea extract may preferably be controlled to a range of from 0.2 to 2.0 when measured in the form of an aqueous solution in which the concentration of non-polymer catechins is 1 wt %. From the standpoints of productivity and stability, the turbidity may be controlled further preferably to a range of from 0.2 to 1.5, more preferably to a range of from 0.2 to 1.0. A turbidity higher than 2.0 makes it difficult to perform smooth purification in a membrane filtration step, while a turbidity lower than 0.2 may develop a problem in the stability of the resulting purified product of green tea extract.

The turbidity is measured using a HITACHI spectrophotometer (model: "U-2001"). The measurement is effected by diluting the aqueous solution of green tea extract with deionized water in a glass cell such that the aqueous solution of green tea extract becomes an aqueous solution in which the concentration of non-polymer catechins is 1 wt %. Upon conducting the analysis, the measurement wavelength of the spectrophotometer is set at 700 nm.

Conditions for the solid-liquid separation are determined as needed to obtain a predetermined turbidity.

As conditions for filtration upon conducting the solid-liquid separation by filtration, the temperature may be preferably from 5 to 70° C., more preferably from 10 to 40° C. The pressure may desirably be within the operational pressure range of a membrane module employed. For example, the pressure may be preferably from 30 to 400 kPa, more preferably from 50 to 400 kPa, still more preferably from 50 to 350 kPa. From the standpoint of achieving the predetermined turbidity, the membrane pore size may range preferably from 1 to 30 µm, more preferably from 2 to 25 µm, still more preferably from 2 to 20 µm. As a measuring method of the membrane pore size, a general measuring method making use of mercury intrusion porosimetry, the bubble point test, the bacterial filtration method or the like can be mentioned. It is, however, preferred to use a value determined by the bubble point test.

As a centrifugator, conventional equipment such as a separation-plate-type centrifugator, cylinder-type centrifugator or decanter-type centrifugator is preferred. As conditions for centrifugal separation, the temperature can be preferably from 5 to 70° C., more preferably from 10 to 40° C., and the rotational speed and time may desirably be set under conditions adjusted to give a predetermined turbidity. In the case of a separation-plate-type centrifugator, for example, the rotational speed may range preferably from 3,000 to 10,000 r/min, more preferably from 5,000 to 10,000 r/min, and the time may range preferably from 0.2 to 30 minutes, more preferably from 0.2 to 20 minutes, still more preferably from 0.2 to 15 minutes.

The polymer membrane for use in the membrane filtration in the present invention can be a polymer, hydrocarbon, fluorohydrocarbon or sulfone membrane. Examples include polymer membranes of polyolefins such as polyethylene and polypropylene; polymer membranes of polyfluorolefins such as polytetrafluoroethylene (PTFE) and polyvinylidene difluolide (PVDF); and polymer membranes of sulfones such as polysulfone (PSU) and polyether sulfone (PES). The material for the membrane filtration may preferably be a general organic membrane, and taking into consideration the elimination of polymer substances, lipids and the like, a material the contact angle of which to water is from 40 to 120°, preferably from 60 to 120° is preferred. As a measuring method of a contact angle to water, a general measuring method, for example, making use of a contact angle meter or a contact angle measuring instrument is preferred. In the case of ceramics, on the other hand, a long time is required for filtration, resulting in extremely poor efficiency. The pore size of the polymer membrane may range preferably from 0.05 to 0.8 µm, more preferably from 0.05 to 0.5 µm, still more preferably from 0.08 to 0.5 µm. A membrane pore size smaller than 0.05 µm leads to a substantial reduction in filtration rate, whereas a membrane pore size greater than 0.8 µm leads to a separation failure and hence, to a deterioration in color. The membrane thickness may range preferably from 0.1 to 2.5 mm, more preferably from 0.3 to 2.0 mm, still more preferably from 0.3 to 1.5 mm.

Examples of such polymer membranes include commercially-available polyolefin membranes such as "PMP-003" (polyolefin membrane, Asahi Kasei Chemicals Corporation), "PSP-103" (polyethylene membrane, Asahi Kasei Chemicals Corporation) and "PSP-303" (polyolefin membrane, Asahi Kasei Chemicals Corporation); commercially-available polyfluorolefin membranes such as "USP-143" (PVDF membrane, Asahi Kasei Chemicals Corporation) and "USW-543" (PVDF membrane, Asahi Kasei Chemicals Corporation); and commercially-available sulfone membranes such as "FB02-FUS5082" (PES membrane, Daicen Membrane Systems, Ltd.) and "FE10-FUS-5082" (PES membrane, Daicen Membrane Systems, Ltd.).

The aqueous solution of green tea extract to be allowed to pass through the filtration membrane in the present invention is an aqueous solution which may contain preferably from 25 to 90 wt %, more preferably from 30 to 90 wt % of non-polymer catechins on a dry weight basis. No limitation is imposed on the membrane filtration temperature, but it may be preferably from 5 to 70° C., more preferably from 10 to 40° C. On the other hand, the hourly processing flow rate of the aqueous solution of green tea extract may be preferably from 8 to 200 L, more preferably from 13 to 200 L per $m^2$ of filtration area. Further, as the type of the membrane, a flat membrane, a spiral membrane, a hollow fiber membrane or the like can be mentioned. From the standpoint of efficient processing, however, a membrane of the continuous processing type such as a spiral membrane or hollow fiber membrane is preferred.

Subsequent to the passage through the filtration membrane, the aqueous solution of green tea extract may preferably have a turbidity of lower than 0.2 as measured with the concentration of non-polymer catechins adjusted to 1 wt %, because the growth of fungi can be inhibited over time.

The purified green tea extract can be used as is, that is, as an aqueous solution of green tea extract in the subsequent step. It is, however, preferred to further concentrate the purified green tea extract into a higher concentrate by distilling off water or into a dried solid, a dried powder, dried granules or the like.

As a high concentration method relying upon concentration or drying, reduced-pressure concentration, reverse osmosis membrane concentration, spray drying, or freeze drying can be mentioned. Compared with conventional, purified green tea extracts, the green tea extract which has been purified by microfiltration is reduced in the heat load applied during reduced-pressure concentration or spray drying and also in the membrane closure during reverse osmosis membrane concentration. It is, therefore, possible to efficiently obtain a high-concentration green tea extract which shows excellent stability when added in beverages. As an efficient high concentration method, it is preferred, for example, to firstly conduct primary concentration to a solid concentration of from 30 to 60% by reduced-pressure concentration or reverse osmosis membrane concentration, and depending on the application, then to form the concentrate into powder by spray drying or freeze drying.

The green tea extract, which has been purified by membrane filtration, is improved in stability with time owing to the elimination of impurities such as polymer substances and lipids. By further dispersing it in a mixed solution of an organic solvent and water and then subjecting the resulting dispersion to treatment in contact with activated carbon and/or acid clay or activated clay, it is possible to obtain a high-quality, low-caffeine, purified green tea extract which is excellent in stability with time despite the inclusion of non-polymer catechins at high concentration.

In view of the extraction efficiency of catechins, the purification and long-term drinkability of the green tea extract, fractionation conditions for the recovered organic solvent, and the like, the final weight ratio of the organic solvent to water in the dispersion formed by dispersing the purified green tea extract in the mixed solution of the organic solvent and water may be set preferably at from 60/40 to 97/3, more preferably at from 60/40 to 75/25 or from 85/15 to 95/5.

As the organic solvent, ethanol, methanol, acetone, ethyl acetate or the like can be mentioned. Among these, a hydrophilic organic solvent such as methanol, ethanol or acetone is preferred, with ethanol being more preferred in view of the use of the purified green tea extract in foods. As water, deionized water, tap water, natural water or the like can be mentioned. These organic solvent and water can be mixed with the microfiltered green tea extract either after combining them together or separately. Preferably, however, they may be mixed with the green tea extract subsequent to combining them into a mixed solution.

In the production of the purified green tea extract by the present invention, it is preferred to conduct the processing by adding from 10 to 40 weight parts, preferably from 10 to 30 weight parts, more preferably from 15 to 30 weight parts of the green tea extract to 100 weight parts of the mixed solution of the organic solvent and water (on a dry weight basis), because the green tea extract can be processed efficiently.

It is still more preferred to include an aging time of from 10 minutes to 180 minutes or so after the completion of the addition of the mixed solution consisting of the organic solvent and water.

These processing can be conducted at from 10 to 60° C., preferably from 10 to 50° C., more preferably from 10 to 40° C.

No particular limitation is imposed on the activated carbon for use in the production of the purified green tea extract by the present invention insofar as it is generally used on an industrial level. Usable examples include commercially-available products such as "ZN-50" (product of Hokuetsu Carbon Industry Co., Ltd.), "KURARAY COAL GLC", "KURARAY COAL PK-D" and "KURARAY COAL PW-D" (products of Kuraray Chemical K.K.), and "SHIROWASHI AW50", "SHIROWASHI A", "SHIROWASHI M" and "SHIROWASHI C" (products of Takeda Pharmaceutical Company Limited).

The pore volume of the activated carbon may be preferably from 0.01 to 0.8 mL/g, more preferably from 0.1 to 0.8 mL/gm. Concerning the specific surface area, on the other hand, one having a specific surface area in a range of from 800 to 1,600 m$^2$/g, preferably from 900 to 1,500 m$^2$/g is preferred. It is to be noted that these physical-values are those determined by the nitrogen adsorption method.

The activated carbon can be added preferably in a proportion of from 0.5 to 8 weight parts, more preferably in a proportion of from 0.5 to 3 weight parts to 100 weight parts of the mixed solution of the organic solvent and water, because such a proportion results in high decaffeination efficiency and low cake resistance in the filtration step.

Acid clay and activated clay for use in the production of the purified green tea extract by the present invention both contain, as general chemical components, $SiO_2$, $Al_2O_3$, $Fe_2O_3$, CaO, MgO, etc., and those having $SiO_2/Al_2O_3$ ratios of from 3 to 12, preferably from 4 to 9 are preferred. Also preferred are those which have compositions containing from 2 to 5 wt % of $Fe_2O_3$, from 0 to 1.5 wt % of CaO and from 1 to 7 wt % of MgO.

Activated clay is obtained by treating a naturally-mined acid clay (montmorillonite clay) with a mineral acid such as sulfuric acid, and is a compound having a porous structure of large specific surface area and adsorbability. Further treatment of acid clay with an acid is known to change its specific surface area such that its decoloring ability is improved and its physical properties are modified.

The specific surface area of acid clay or activated clay may preferably be from 50 to 350 m$^2$/g although it varies depending on the degree or the like of the acid treatment, and its pH (5 wt % suspension) may be preferably from 2.5 to 8, more preferably from 3.6 to 7. Usable examples of acid clay include commercially-available products such as "MIZUKA ACE #600" (product of Mizusawa Chemical Industries, Ltd.)

When activated carbon is used in combination with acid clay or activated clay, the ratio of activated carbon to acid clay or activated clay may be from 1 to 10 of acid clay or activated clay to 1 activated carbon by weight, with activated carbon: acid clay or activated clay=1:1 to 1:6 being preferred.

Acid clay or activated clay can be added preferably in a proportion of from 2.5 to 25 weight parts, more preferably in a proportion of from 2.5 to 15 weight parts to 100 weight parts of the mixed solution of the organic solvent and water. The addition of acid clay or activated clay in an unduly small proportion leads to a deterioration in decaffeination efficiency, while the addition of acid clay or activated clay in an excessively large proportion leads to an increase in the cake resistance in the filtration step. It is, therefore, not preferred to add acid clay or activated clay in a proportion outside the above-described range.

In the production of the purified green tea extract by the present invention, no particular limitation is imposed on the order of contacting the green tea extract purified by membrane filtration, the mixed solution of the organic solvent and water, and activated carbon and/or acid clay or activated clay. A preferred method can be (a) to dissolve the green tea extract in the mixed solution of the organic solvent and water and then to bring the resulting solution into contact with activated carbon and/or acid clay or activated clay, (b) to treat a dispersion, in which activated carbon and/or acid clay or activated clay is dispersed, and the green tea extract in contact with the mixed solution of the organic solvent and water, or (c) to bring the green tea extract, the mixed solution of the organic solvent and water and acid clay or activated clay into contact with one another and then to bring the resulting mixture into contact with activated carbon. A filtration step may be interposed between these steps, and subsequent to filtration, the latter step may then be conducted.

For obtaining a purified green tea extract with non-polymer catechins efficiently extracted therein, it is preferred to effect the contact between the green tea extract, which has been purified by membrane filtration, and acid clay or activated clay by adjusting the pH to a range of from 4 to 6. Upon effecting the contact, an organic acid such as citric acid, lactic acid, tartaric acid, succinic acid or malic acid may preferably be added at a weight ratio of the organic acid to the non-polymer catechins (organic acid/non-polymer catechins) in a range of from 0.01 to 0.20.

The treatment of the green tea extract, which has been purified by membrane filtration, by its contact with activated carbon and/or acid clay or activated clay can be conducted by any method such as a batchwise treatment method or a continuous treatment method making use of a column. As a method for bringing the green tea extract into contact with activated carbon, the contact may be effected preferably by continuous treatment through a column packed with activated carbon. Adopted in general is a method that powdery activated carbon or the like is added, the resulting mixture is stirred to selectively adsorb caffeine, and filtration is conducted to obtain a decaffeinated filtrate or a method that caffeine is selectively adsorbed by continuous treatment through a column packed with granular activated carbon or the like.

Upon separating activated carbon or the like from the mixed solution, the temperature may be preferably from −15 to 78° C., more preferably from −5 to 40° C. Outside this temperature range, the separability may be deteriorated and some changes may be observed in the properties of the solution, in some instances.

As a separation method, a conventional technique can be applied. Instead of a conventional method such as so-called filter separation or centrifugal separation, the separation or the like can also be conducted by allowing the mixed solution to pass through a column packed with a granular substance such as activated carbon.

The purified green tea extract produced as described above contains 35 to 90 wt % of non-polymer catechins based on its solid content and also caffeine at a non-polymer/caffeine weight ratio of from 4 to 200. The purified green tea extract can be in either a liquid form or a solid form. To obtain the purified green tea extract in a solid form, it may be formed into powder by a method such as freeze drying or spray drying.

The yield of the non-polymer catechins in the mixed solution of the organic solvent and water after the treatment may be preferably 60 wt % or higher, more preferably 65 wt % or higher, still more preferably 70 wt % or higher, even more preferably 80 wt % or more based on the amount of the non-polymer catechins before the treatment.

Further, the content of the gallates consisting of catechingallate, epicatechingallate, gallocatechingallate and epigallocatechingallate in the non-polymer catechins in the purified green tea extract may be preferably from 10 to 70 wt %, more preferably from 30 to 60 wt % from the standpoints of the effectiveness of physiological effects of the non-polymer catechins and bitterness reduction. The proportion of the gallocatechins in the whole non-polymer catechins may be preferably from 50 to 100 wt %, more preferably from 55 to 100 wt %, still more preferably from 60 to 95 wt %.

The content weight ratio ((A)/(B)) of the non-polymer catechins (A) to the caffeine (B) in the purified green tea extract may be preferably from 4 to 200, more preferably from 5 to 200, still more preferably from 15 to 200, even more preferably from 30 to 200.

The purified green tea extract may contain preferably from 5 to 90 wt %, more preferably from 10 to 90 wt % of non-polymer catechins. Based on the solid content of the purified green tea extract, the purified green tea extract may contain preferably from 35 to 90 wt %, more preferably from 40 to 90 wt % of non-polymer catechins.

The weight ratio of non-polymer catechins to tannin in the purified green tea extract according to the present invention may preferably be from 0.50 to 0.98. It is to be noted that the analysis of tannin is conducted by the ferrous tartrate method.

The resulting purified green tea extract still contains non-polymer catechins at high concentration and has a good color despite its low caffeine concentration and its lowered content of turbid components. Therefore, the thus-obtained purified green tea extract is useful as packaged beverages, and is more useful as tea-based beverages such as green tea, oolong tea and blend tea and also as non-tea beverages such as sports drinks and isotonic drinks.

The packaged beverage according to the present invention contains non-polymer catechins, each of which is in a form dissolved in water, at a content of from 0.03 to 1.0 wt %, preferably from 0.04 to 0.5 wt %, more preferably from 0.06 to 0.4 wt %, still more preferably from 0.07 to 0.4 wt %, yet more preferably from 0.08 to 0.3 wt %, even more preferably from 0.09 to 0.3 wt %, still even more preferably from 0.1 to 0.3 wt %. In so far as the content of non-polymer catechins falls within the above-described range, a great deal of non-polymer catechins can be taken with ease, and from the standpoint of the color of the beverage shortly after its preparation, this content range is also preferred. The concentration of the non-polymer catechins can be adjusted by relying upon the amount of the purified product of green tea extract reduced in the content of turbid components and to be mixed.

Further, the daily intake of green tea required for an adult to exhibit the effects of the promotion of accumulated fat burning, the promotion of dietary fat burning and the promotion of β-oxidation gene expression in the liver is preferably 300 mg or more, more preferably 450 mg or more, still more preferably 500 mg or more in terms of non-polymer catechins. Specifically, it has been confirmed that an anti-puffiness effect and/or visceral fat reducing effect can be brought about by ingesting a beverage which contains 483 mg, 555 mg or 900 mg of non-polymer catechins per package (JP-A-2002-326932).

Therefore, the daily intake of the packaged beverage according to the present invention can also be preferably 300 mg or more, more preferably 450 mg or more, still more preferably 500 mg or more in terms of non-polymer catechins. From the standpoint of assuring to meet the minimum daily intake requirement, the non-polymer catechins can be mixed in an amount of preferably 300 mg or more, more preferably 450 mg or more, still more preferably 500 mg or more in each package of the packaged beverage according to the present invention.

The content weight ratio of the non-polymer catechins to caffeine (the non-polymer catechins/caffeine) in the packaged beverage according to the present invention may be preferably from 4 to 200, more preferably from 15 to 200, still more preferably from 30 to 200.

The packaged beverage according to the present invention may contain sodium ions and/or potassium ions. Beverages of the present invention with such ions incorporated therein are useful in the form of drinks such as sports drinks and isotonic drinks. The term "sports drink" is generally defined to mean a drink that can promptly replenish water and minerals lost in the form of sweat during physical exercise.

Sodium and potassium can be mentioned as primary physiological electrolytes. These ion ingredients can be included by adding their corresponding water-soluble ingredients or inorganic salts. They are also found in fruit juices and tea extracts. The amount of an electrolyte or ion ingredient in the packaged beverage according to the present invention is its content in the final packaged beverage ready for drinking. The concentration of each electrolyte is expressed in terms of "ion concentration". In the beverage according to the present invention, a potassium ion ingredient can be mixed as a salt such as potassium chloride, potassium carbonate, potassium sulfate, potassium acetate, potassium hydrogencarbonate, potassium citrate, potassium phosphate, potassium hydrogenphosphate, potassium tartrate, potassium sorbate or a mixture thereof or as a component of an added fruit juice or tea. In the packaged beverage according to the present invention, potassium ions can be contained at a concentration of preferably from 0.001 to 0.2 wt %, more preferably from 0.002 to 0.15 wt %, even more preferably from 0.003 to 0.12 wt %. Similarly, a sodium ion ingredient can also be mixed as a readily-available sodium salt such as sodium chloride, sodium carbonate, sodium hydrogencarbonate, sodium citrate, sodium phosphate, sodium hydrogenphosphate, sodium tartrate, sodium benzoate or a mixture thereof or as a component of an added fruit juice or tea. A lower sodium ion concentration is desired from the standpoint of facilitating the absorption of water under osmotic pressure. Preferably, however, the sodium ion concentration should be controlled to such a low level as avoiding the absorption of water into the intestine from the body under osmotic pressure. The sodium ion concentration required to achieve such a low level can preferably be lower than the plasma sodium ion concentration. In the packaged beverage according to the present invention, sodium ions can be contained at a concentration of preferably from 0.001 to 0.5 wt %, more preferably from 0.002 to 0.4 wt %, still more preferably from 0.003 to 0.2 wt %. In addition to potassium ions and sodium ions, from 0.001 to 0.5 wt %, preferably from 0.002 to 0.4 wt %, still more preferably from 0.003 to 0.3 wt % of chloride ions can also be incorporated in the packaged beverage according to the present invention. A chloride ion ingredient can be mixed in the form of a salt such as sodium chloride or potassium chloride. Further, trace ions such as calcium, magnesium, zinc and/or iron ions can also be mixed. These ions can also be mixed in the form of salt or salts. The total amount of ions existing in the beverage includes not only an added amount of ions but also an amount of ions naturally existing in the beverage. When sodium chloride is added, for example, the amounts of sodium ions and chloride ions in the thus-added sodium chloride are included in the total amount of ions existing in the beverage.

Depending upon the situation of drinking, an excessively low concentration of sodium ions and potassium ions may be unable to provide a fulfilled feeling in taste and to achieve an effective replenishment of minerals, and therefore, may not be preferred. An unduly high concentration of sodium ions and potassium ions, on the other hand, leads to stronger tastes of the salts themselves and is not preferred for long-term drinking.

In the packaged beverage according to the present invention, a sweetener may also be used to improve the taste. As the sweetener, an artificial sweetener, carbohydrate or glycerol (for example, glycerin) can be used. The content of such a sweetener in the packaged beverage according to the present invention may be preferably from 0.0001 to 20 wt %, more preferably from 0.001 to 15 wt %, even more preferably from 0.001 to 10 wt % from the standpoints of the balance among sweetness, sourness and saltiness, avoidance of excessive sweetness and a reduction in the feeling of being caught in the throat and an improvement in the feeling as the beverage passes down the throat.

As sweeteners usable in the packaged beverage according to the present invention, the use of an artificial sweetener is preferred. Example of the artificial sweetener include high-sweetness sweeteners such as saccharin, saccharin sodium, aspartame, acesulfame-K, sucralose and neotame; and sugar alcohols such as sorbitol, erythritol and xylitol. As a commercial product, "SLIM-UP SUGAR" composed of aspartame, "LAKANTO-S" containing erythritol, or "PALSWEET" composed of erythritol and aspartame can be used.

When the desired packaged beverage is also intended to replenish energy, it is preferred to use a carbohydrate sweetener. As the carbohydrate sweetener, a soluble carbohydrate can be used. A soluble carbohydrate plays a role not only as a sweetener but also as an energy source. Upon choosing a carbohydrate for use in the beverage according to the present invention, it is important to take into consideration the need for a sufficient gastric emptying rate and intestinal absorption rate.

The carbohydrate can be a mixture of glucose and fructose, or a carbohydrate hydrolyzable into glucose and fructose or capable of forming glucose and fructose in the digestive tract. The term "carbohydrate" as used herein includes monosaccharides, disaccharides, oligosaccharides, conjugated polysaccharides, and mixtures thereof.

Monosaccharides usable in the present invention include tetroses, pentoses, hexoses and ketohexoses. As hexoses, there are aldohexoses such as glucose known as grape sugar. The content of glucose in the packaged beverage can be preferably from 0.0001 to 20 wt %, more preferably from 0.001 to 15 wt %, still more preferably from 0.001 to 10 wt %. Fructose known as fruit sugar is a ketohexose. The content of fructose in the packaged beverage according to the present invention can be preferably from 0.0001 to 20 wt %, more preferably from 0.001 to 15 wt %, still more preferably from 0.001 to 10 wt %.

Preferred in the packaged beverage according to the present invention is a single artificial sweetener system or a combination of an artificial sweetener and a glucose compound or an artificial sweetener and a fructose compound.

As a carbohydrate sweetener for use in the present invention, a soluble carbohydrate can be employed. As an oligosaccharide, a carbohydrate which forms these two monosaccharides in vivo (specifically, sucrose, maltodextrin, corn syrup, and fructose-rich corn syrup) can be mentioned. It is a disaccharide that is an important type of the saccharide. An illustrative disaccharide is sucrose known as cane sugar or beet sugar. The content of sucrose in the packaged beverage according to the present invention can be preferably from 0.001 to 20 wt %, more preferably from 0.001 to 15 wt %, still more preferably from 0.001 to 10 wt %.

The pH of the packaged beverage according to the present invention can be preferably from 2 to 7, more preferably from 2 to 6.7, still more preferably from 2.8 to 6.5 from the standpoint of the stability of catechins. An excessively low pH provides the beverage with a stronger sour taste and pungent smell. An unduly high pH, on the other hand, leads to a failure in achieving a harmony in flavor and also to a reduction in taste. Such an excessively low pH or unduly high pH is, therefore, not preferred.

The addition of a bitterness suppressor to the packaged beverage according to the present invention facilitates its drinking, and therefore, is preferred. Although no particular limitation is imposed on the bitterness suppressor to be used, a cyclodextrin is preferred. As the cyclodextrin, an $\alpha$-, $\beta$- or $\gamma$-cyclodextrin or a branched $\alpha$-, $\beta$- or $\gamma$-cyclodextrin can be used. In the beverage, a cyclodextrin may be contained preferably at from 0.005 to 0.5 wt %, more preferably at from 0.01 to 0.3 wt %. To the packaged beverage according to the present invention, it is possible to add, either singly or in combination, additives such as antioxidants, flavorings, various esters, organic acids, organic acid salts, inorganic acids, inorganic acid salts, inorganic salts, colors, emulsifiers, preservatives, seasoning agents, sweeteners, sour seasonings, gums, oils, vitamins, amino acids, fruit extracts, vegetable extracts, flower honey extracts, pH regulators and quality stabilizers.

To the beverage according to the present invention, one or more of flavorings and fruit juices may preferably be added to improve the taste. In general, the juice of a fruit is called "fruit juice" and a flavoring is called "flavor". Natural or synthetic flavorings and fruit juices can be used in the present invention. They can be selected from fruit juices, fruit flavors, plant flavors, and mixtures thereof. For example, a combination of a fruit juice with a tea flavor, preferably a green tea or black tea flavor has attractive taste. Preferred fruit juices include apple, pear, lemon, lime, mandarin, grapefruit, cranberry, orange, strawberry, grape, kiwi, pineapple, passion fruit, mango, guava, raspberry and cherry juices, and mixtures thereof. More preferred are citrus juices (preferably, grapefruit, orange, lemon, lime and mandarin juices), mango juice, passion fruit juice, guava juice, and mixtures thereof. Preferred natural flavors include jasmine, chamomile, rose, peppermint, *Crataegus cuneata*, chrysanthemum, water caltrop, sugarcane, bracket fungus of the genus *Fomes* (*Fomes japonicus*), bamboo shoot, and the like. Such a juice can be contained preferably at from 0.001 to 20 wt %, more preferably at from 0.002 to 10 wt % in the beverage according to the present invention. Fruit flavors, plant flavors, tea flavors and mixtures thereof can also be used as fruit juices. Still more preferred flavorings are citrus flavors including orange flavor, lemon flavor, lime flavor and grapefruit flavor. In addition to such citrus flavors, various other fruit flavors such as apple flavor, grape flavor, raspberry flavor, cranberry flavor, cherry flavor and pineapple flavor are also usable. These flavorings can be derived from natural sources such as fruit juices and balms, or can be synthesized. The term "flavoring" as used herein can also include blends of various flavors, for example, a blend of lemon and lime flavors and blends of citrus flavors and selected spices. Such a flavoring can be added preferably at from 0.0001 to 5 wt %, more preferably at from 0.001 to 3 wt % to the beverage according to the present invention.

The beverage according to the present invention may also contain a sour seasoning as needed. As the sour seasoning, an edible acid such as malic acid, citric acid, tartaric acid, or fumaric acid can be mentioned. A sour seasoning may also be used to adjust the pH of the beverage according to the present invention. The pH of the beverage according to the present invention may preferably be from 2 to 7. As a pH adjuster, an organic or inorganic, edible acid can be used. The acid can be used either in a non-dissociated form or in the form of its salt, for example, potassium hydrogenphosphate, sodium hydrogenphosphate, potassium dihydrogen phosphate, or sodium dihydrogen phosphate. Preferred acids can be edible organic acids including citric acid, malic acid, fumaric acid, adipic acid, phosphoric acid, gluconic acid, tartaric acid, ascorbic acid, acetic acid, phosphoric acid, and mixtures thereof. Still more preferred acids are citric acid and malic acid. A sour seasoning is also useful as an antioxidant which stabilizes the ingredients in the beverage. Examples of commonly employed antioxidants include ascorbic acid, EDTA (ethylenediaminetetraacetic acid) and salts thereof, and plant extracts.

In the beverage according to the present invention, one or more vitamins can be incorporated further. Preferably, vitamin A, vitamin C, and vitamin E can be added. Other vitamins such as vitamin D and vitamin B may also be added. One or more minerals can also be used in the beverage according to the present invention. Preferred minerals include calcium, chromium, copper, fluorine, iodine, iron, magnesium, manganese, phosphorus, selenium, silicon, molybdenum, and zinc. More preferred minerals are magnesium, phosphorus, and iron.

As in general beverages, a package useful with the packaged beverage according to the present invention can be provided in a conventional form such as a molded package made of polyethylene terephthalate as a principal component (a so-called PET bottle), a metal can, a paper container combined with metal foils or plastic films, a bottle or the like. The term "packaged beverage" as used herein means a beverage that can be taken without dilution.

The packaged beverage according to the present invention can be produced, for example, by filling the beverage in a package such as a metal can and, when heat sterilization is feasible, conducting heat sterilization under sterilization conditions as prescribed in the Food Sanitation Act. For those which cannot be subjected to retort sterilization like PET bottles or paper packages, a process is adopted such that the beverage is sterilized beforehand at a high temperature for a short time under similar sterilization conditions as those described above, for example, by a plate-type heat exchanger or the like, is cooled to a particular temperature, and is then filed in a package. Under aseptic conditions, additional ingredients may be added to and filled in a beverage-filled package. It is also possible to conduct an operation such that subsequent to heat sterilization under acidic conditions, the pH of the beverage is caused to rise back to neutral under aseptic conditions or that subsequent to heat sterilization under neutral conditions, the pH of the beverage is caused to drop back to the acidic side under aseptic conditions.

EXAMPLES

Analysis of Catechins

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A non-polymer catechin composition was diluted with distilled water, filtered through a filter (0.8 μm), and then subjected to chromatography at a column temperature of 35° C. by the gradient elution method making use of a solution A and a solution B. The solution A, mobile phase, Was a solution containing acetic acid at 0.1 mol/L in distilled water, while the solution B, mobile phase, was a solution containing acetic acid at 0.1 mol/L in acetonitrile. The measurement was conducted under the conditions of 20 μL sample injection volume and 280 nm UV detector wavelength.

Analysis of Caffeine (Analyzer)

A HPLC system (manufactured by Hitachi, Ltd.) was used. Plotter: "D-2500", Detector: "L-4200", Pump: "L-7100", Autosampler: "L-7200", Column: "INTERSIL ODS-2" (2.1 mm inner diameter×250 mm length).

(Analytical Conditions)

Sample injection volume: 10 μL

Flow rate: 1.0 mL/min

Detection wavelength of UV spectrophotometer: 280 nm

Eluent A: A 0.1 mol/M solution of acetic acid in water

Eluent B: A 0.1 mol/L M solution of acetic acid in acetonitrile

Concentration gradient conditions (vol. %)

| Time (min) | Eluent A | Eluent B |
|---|---|---|
| 0 | 97 | 3 |
| 5 | 97 | 3 |
| 37 | 80 | 20 |
| 43 | 80 | 20 |
| 43.5 | 0 | 100 |

-continued

| Time (min) | Eluent A | Eluent B |
|---|---|---|
| 48.5 | 0 | 100 |
| 49 | 97 | 3 |
| 62 | 97 | 3 |

(Retention Time of Caffeine)
Caffeine: 27.2 min
From each area % determined here, the corresponding wt % was determined based on the standard substance.
Analysis of Tannin
Using ethyl gallate as a standard solution, the content of tannin was determined in terms of an equivalent amount of gallic acid by the ferrous tartrate method (referential publication: "Green Tea Polyphenols", Technology Series for the Effective Utilization of Functional Ingredients for Beverages and Foods, No. 10). A sample (5 mL) was stained with the standard ferrous tartrate solution (5 mL). With a phosphate buffer, the volume of the thus-stained sample was adjusted to 25 mL. Its absorbance was measured at 540 nm, and from a calibration line for ethyl gallate, the content of tannin was determined.
Preparation of the standard ferrous tartrate solution: Ferrous sulfate heptahydrate (100 mg) and potassium sodium tartrate (500 mg) were dissolved with distilled water to 100 mL.
Preparation of the phosphate buffer: A $1/15$ mol/L solution of disodium hydrogenphosphate and a $1/15$ mol/L solution of sodium dihydrogen phosphate were mixed to give pH 7.5.
<Assessment of Membrane-Filtered Products>
Measurement of Turbidity
Using a HITACHI spectrophotometer (Model: U-2001), each membrane-filtered product of green tea extract was diluted with deionized water in a glass cell to provide an aqueous solution in which the concentration of non-polymer catechins was 1 wt %, and was then measured. The measurement wavelength of the spectrophotometer at the time of the analysis was set at 700 nm.
Assessment of Chemical Stability
Each membrane-filtered product of green tea extract was diluted with deionized water such that the concentration of non-polymer catechins was lowered to 10 mg/mL. An assessment was made by measuring the amount of catechins remaining in the assessment sample filled in a 50-mL vial and its turbidity (700 nm).
Visual Assessment of Biological Stability
Each membrane-filtered product of green tea-extract was diluted with deionized water such that the concentration of non-polymer catechins was lowered to 10 mg/mL, and was then filled in a 50-mL vial. After stored at 25° C. for 3 days, the assessment sample contained in the vial was observed for the state of its contents on an illuminator, and the state of the contents was visually ranked in accordance with the following standards:
A: No growth of fungi
B: Very slight growth of fungi was observed
C: Slight growth of fungi was observed
Assessment of Color
(Analyzer)
Each membrane-filtered product of green tea extract was diluted with deionized water such that the concentration of non-polymer catechins was lowered to 180 mg/100 mL, and using the sample, the assessment of its external appearance was made visually.

Example 1

Purification of Green Tea Extracts by Membrane Filtration

Present Invention 1
Green tea leaves (200 g) were extracted for 30 minutes with deionized water (3 L) of 90° C. The extract was coarsely filtered through a 200-mesh stainless steel filter. The filtrate was subjected to centrifugal separation (5,000 r/min) at 25° C. for 30 minutes so that the filtrate was separated into green tea leaves and a green tea extract by solid-liquid separation. After the green tea extract (the content of non-polymer catechins: 1.0 wt %, turbidity: 0.29) was allowed to pass at 30° C. through a polyolefin membrane of 0.25 μm (Asahi Kasei Chemicals Corporation, "PMP-003"), the passed solution was subjected to primary concentration under reduced pressure until the solid concentration arose to 40 wt %. Freeze drying was then conducted to obtain a catechin powder.
Present Invention 2
A catechin powder was obtained in a similar manner as in Present Invention 1 except that a green tea extract was allowed to pass through a polyethylene membrane of 0.1 μm (Asahi Kasei Chemicals Corporation, "PSP-103").
Present Invention 3
A catechin powder was obtained in a similar manner as in Present Invention 1 except that a green tea extract was allowed to pass through a polyvinylidene difluoride (PDVF) membrane of 0.1 μm (Asahi Kasei Chemicals Corporation, "USP-143").
Present Invention 4
A catechin powder was obtained in a similar manner as in Present Invention 1 except that a green tea extract was allowed to pass through a polyolefin membrane of 0.1 μm (Asahi Kasei Chemicals Corporation, "PSP-003").
Present Invention 5
A catechin powder was obtained in a similar manner as in Present Invention 1 except that a green tea extract was allowed to pass through a polyether sulfone (PES) membrane of 0.06 μm (Daicen Membrane Systems Ltd., "FB02-FUS5082")

Comparative Example 1

A catechin powder was obtained in a similar manner as in Present Invention 1 except that a green tea extract was allowed to pass through a polytetrafluoroethylene (PTFE) membrane of 1 μm (ADVANTEC, "H100A090C").

Comparative Example 2

A catechin powder was obtained in a similar manner as in Present Invention 1 except that a green tea extract was allowed to pass through a cellulose acetate (CA) membrane of 0.45 μm (ADVANTEC, "DISMIC25").

Comparative Example 3

A catechin powder was obtained in a similar manner as in Present Invention 1 except that a green tea extract was allowed to pass through a PAN (polyacrylonitrile) membrane having a molecular weight cutoff of 13,000 (Asahi Kasei Chemicals Corporation, "ACP-013") as an ultrafiltration membrane.

Comparative Example 4

Green tea leaves (200 g) were extracted for 30 minutes with deionized water (3 L) of 90° C. The extract was coarsely filtered through a 200-mesh stainless steel filter. After the green tea extract (the content of non-polymer catechins: 1.0 wt %, turbidity: 4.0) was allowed to pass at 30° C. through a polyvinylidene difluoride (PVDF) membrane of 0.1 μm (Asahi Kasei Chemicals Corporation, "USP-143"), the passed solution was subjected to primary concentration under reduced pressure until the solid concentration arose to 40 wt %. Freeze drying was then conducted to obtain a catechin powder.

Comparative Example 5

Green tea leaves (200 g) were extracted for 30 minutes with deionized water (3 L) of 90° C. The extract was coarsely filtered through a 200-mesh stainless steel filter. The filtrate was subjected to centrifugal separation (10,000 r/min) at 25° C. for 60 minutes so that the filtrate was separated into green tea leaves and a green tea extract by solid-liquid separation. After the green tea extract (the content of non-polymer catechins: 1.0 wt %, turbidity: 0.01) was allowed to pass at 30° C. through a polyvinylidene difluoride (PVDF) membrane of 0.1 μm (Asahi Kasei Chemicals Corporation, "USP-143"), the passed solution was subjected to primary concentration under reduced pressure until the solid concentration arose to 40 wt %. Freeze drying was then conducted to obtain a catechin powder.

Filtration conditions and analysis data of the resultant catechin powders are shown in Table 1 and Table 2.

TABLE 1

|  |  | Present Invention | | | | |
| --- | --- | --- | --- | --- | --- | --- |
|  |  | 1 | 2 | 3 | 4 | 5 |
| Filtration conditions | Membrane pore size (μm) | 0.25 | 0.1 | 0.1 | 0.1 | 0.06 |
|  | Molecular weight cutoff | — | — | — | — | — |
|  | Material | Polyolefin | Polyethylene | PVDF | Polyolefin | PES |
|  | Maker | Asahi Kasei | Asahi Kasei | Asahi Kasei | Asahi Kasei | Daicen |
|  | Model | "PMP-003" | "PSP-103" | "USP-143" | "PSP-003" | "FB02-FUS5082" |
|  | Membrane thickness[1] (mm) | 0.5 | 0.5 | 0.9 | 0.5 | 0.5 |
|  | Inner membrane diameter (mm) | 0.7 | 0.7 | 1.4 | 0.7 | 0.8 |
| Turbidity before membrane filtration[3] (700 nm) |  | 0.29 | 0.31 | 0.31 | 0.38 | 0.32 |
| Filtration efficiency (catechins) (%) |  | 100 | 98 | 98 | 99 | 98 |
| Turbidity after membrane filtration[3] (700 nm) |  | 0.04 | 0.03 | 0.03 | 0.03 | 0.06 |
| Processing time[2] (hr) |  | 3 | 2 | 2 | 5 | 7 |
| Non-polymer catechins/caffeine after membrane filtration (weight ratio) |  | 6 | 6 | 6 | 6 | 6 |
| Content of gallates in non-polymer catechins after membrane filtration (wt %) |  | 51 | 51 | 51 | 51 | 51 |
| Content of gallocatechins in non-polymer catechins after membrane filtration (wt %) |  | 76 | 76 | 76 | 76 | 76 |
| Concentration of non-polymer catechins in solids after membrane filtration (wt %) |  | 34 | 33 | 34 | 32 | 35 |
| Non-polymer catechins/tannin ratio after membrane filtration (weight ratio) |  | 0.73 | 0.73 | 0.73 | 0.73 | 0.73 |
| Assessment of membrane-filtered products (immediately after membrane filtration) |  | Color was good, and stability was visually good. | Color was good, and stability was visually good. | Color was good, and stability was visually good. | Color was good, and stability was visually good. | Color was good, and stability was visually good. |
| Non-polymer catechins after membrane filtration (wt %) |  |  |  |  |  |  |
| GC |  | 9 | 8 | 8 | 9 | 9 |
| EGC |  | 29 | 29 | 29 | 28 | 28 |
| C |  | 3 | 3 | 3 | 3 | 3 |
| EC |  | 8 | 10 | 9 | 9 | 9 |
| EGCg |  | 36 | 36 | 37 | 36 | 36 |
| GCg |  | 3 | 2 | 2 | 3 | 3 |
| ECg |  | 11 | 11 | 11 | 11 | 11 |
| Cg |  | 1 | 1 | 1 | 1 | 1 |
| Assessment (3 days later) | Assessment of membrane-filtered products | Good color and stability | Good color and stability | Good color and stability | Good color and stability | Good color and stability |
|  | Remainder of catechins (%) | 97 | 97 | 97 | 97 | 97 |
|  | Turbidity[3] (700 nm) | 0.04 | 0.04 | 0.04 | 0.05 | 0.07 |
|  | Biological stability | A | A | A | A | A |

[1] Outer diameter − inner diameter,
[2] per 100 L and m$^2$,
[3] 1 wt % aqueous solution of non-polymer catechins

TABLE 2

|  |  | Comparative Examples | | | | |
| --- | --- | --- | --- | --- | --- | --- |
|  |  | 1 | 2 | 3 | 4 | 5 |
| Filtration conditions | Membrane pore size (μm) | 331.0 | 0.45 | — | 0.1 | 0.1 |
|  | Molecular weight cutoff | — | — | 13,000 | — | — |
|  | Material | PTFE | CA | PAN | PVDF | PVDF |
|  | Maker | ADVANTEC | ADVANTEC | Asahi Kasei | Asahi Kasei | Asahi Kasei |
|  | Model | "H100A090C" | "DISMIC 25cs" | "ACP-0013" | "USP-143" | "USP-143" |
|  | Membrane thickness[1] (mm) | — | — | 0.6 | 0.9 | 0.9 |
|  | Inner membrane diameter (mm) | — | — | 0.8 | 1.4 | 1.4 |
| Turbidity before membrane filtration[3] (700 nm) | | 0.30 | 0.28 | 0.30 | 4.0 | 0.01 |
| Filtration efficiency (catechins) (%) | | 100 | 100 | 93 | 98 | 98 |
| Turbidity after membrane filtration[3] (700 nm) | | 0.89 | 0.32 | 0.03 | 0.03 | 0.01 |
| Processing time[2] (hr) | | — | — | 16 | 10 | 2 |
| Non-polymer catechins/caffeine after membrane filtration (weight ratio) | | 6 | 6 | 6 | 6 | 6 |
| Content of gallates in non-polymer catechins after membrane filtration (wt %) | | 51 | 51 | 50 | 51 | 50 |
| Content of gallocatechins in non-polymer catechins after membrane filtration (wt %) | | 76 | 76 | 76 | 76 | 76 |
| Concentration of non-polymer catechins in solids after membrane filtration (wt %) | | 31 | 31 | 30 | 34 | 31 |
| Non-polymer catechins/tannin ratio after membrane filtration (weight ratio) | | 0.71 | 0.71 | 0.73 | 0.73 | 0.73 |
| Assessment of membrane-filtered products (immediately after membrane filtration) | | Color was poor, and flocculates suspended | Color was poor, and flocculates suspended | Color was good. | Color was good. | Color was good. |
| Non-polymer catechins after membrane filtration (wt %) | | | | | | |
| GC | | 9 | 8 | 8 | 8 | 8 |
| EGC | | 28 | 29 | 29 | 29 | 29 |
| C | | 3 | 3 | 3 | 3 | 3 |
| EC | | 9 | 10 | 9 | 9 | 9 |
| EGCg | | 36 | 36 | 37 | 37 | 37 |
| GCg | | 3 | 2 | 2 | 2 | 2 |
| ECg | | 11 | 11 | 11 | 11 | 11 |
| Cg | | 1 | 1 | 1 | 1 | 1 |
| Assessment (3 days later) | Assessment of membrane-filtered products | Poor color and stability | Poor color and stability | Poor color and stability | Good color and stability | Poor color and stability |
|  | Remainder of catechins (%) | 95% | 93% | 81% | 97% | 90% |
|  | Turbidity[3] (700 nm) | 1.25 | 0.57 | 2.96 | 0.09 | 1.50 |
|  | Biological stability | C | B | C | A | C |

[1] Outer diameter − inner diameter,
[2] per 100 L and m$^2$,
[3] 1 wt % aqueous solution of non-polymer catechins The green extracts purified by conducting membrane-filtration in accordance with the present invention were all good in color and also good in chemical and biological stability. In each of the cases of the filtration through the membrane having the pore size of 1 μm or greater and the membrane filtration making use of the CA membrane of 0.45 μm (Comparative Examples 1 and 2), on the other hand, the initial color was poor, the turbidity was high, the suspension of flocculates was observed, and the chemical and biological stability was inferior. In the case of the filtration through the membrane having the pore size of 13,000 in terms of molecular weight cutoff (Comparative Example 3), the chemical and biological stability was inferior although the initial color was good. When no solid-liquid separation was conducted before membrane filtration (Comparative Example 4), the processing time was long. When solid-liquid separation was excessively conducted in contrast (Comparative Example 5), the chemical and biological stability was inferior.

Example 2

Production of Purified Green Tea Extracts

Present Invention 6

After acid clay "MIZUKA ACE #600" (Mizusawa Chemical Industries, Ltd.) (37.5 g) and a filter aid "SOLCA FLOC" (Imazu Chemical Co., Ltd.) (12 g) were dispersed in a 68 wt % aqueous solution of ethanol (800 g), the catechin powder (Present Invention 1) produced in Example 1 was added, followed by stirring at 40° C. for about 2 hours. Subsequently, the mixture was filtered through No. 2 filter paper, brought into contact with activated carbon "KURARAY COAL GLC" (pore volume: 0.758 mL/g, specific surface area: 1,460 m$^2$/g; Kuraray Chemical Co., Ltd.) (32 g), and then subjected to filtration again through a membrane filter of 0.2 μm. Finally, ethanol was distilled off at 40° C. and 0.0272 kg/cm$^2$, and the water content was then adjusted to obtain a purified green tea extract.

Present Invention 7

A purified green tea extract was obtained in a similar manner as in Present Invention 6 except that the catechin powder (Present Invention 2) produced in Example 1 was added.

Present Invention 8

A purified green tea extract was obtained in a similar manner as in Present Invention 6 except that the catechin powder (Present Invention 3) produced in Example 1 was added.

Comparative Example 6

Green tea leaves (200 g) were extracted for 30 minutes with deionized water (3 L) of 90° C. The extract was coarsely filtered through a 200-mesh stainless steel filter. The filtrate was subjected to centrifugal separation (5,000 r/min) at 25° C. for 30 minutes so that the filtrate was separated into green tea leaves and a green tea extract by solid-liquid separation. After the green tea extract (the content of non-polymer catechins: 1.0 wt %, turbidity: 0.29) was allowed to pass at 30° C. through a stainless steel filter of 5 μm, the passed solution was subjected to primary concentration under reduced pressure until the solid concentration arose to 40 wt %. Freeze drying was then conducted to obtain a catechin powder. Subsequently, a purified green tea extract was obtained in a similar manner as in Present Invention 6 except for the addition of the catechin powder.

Comparative Example 7

A catechin powder was produced in a similar manner as in Comparative Example 6 except for the passage through a ceramic membrane of 0.1 μm ("CEFILT", NGK Industries, Ltd.) in place of the stainless steel filter of 5 μm. Subsequently, a purified green tea extract was obtained in a similar manner as in Present Invention 6 except for the addition of the catechin powder.

Comparative Example 8

A purified green tea extract was obtained in a similar manner as in Present Invention 6 except that the catechin powder (Comparative Example 3) produced in Example 1 was added.

Comparative Example 9

After the acid clay "MIZUKA ACE #600" (Mizusawa Chemical Industries, Ltd.) (200 g) and the filter aid "SOLCA FLOC" (Imazu Chemical Co., Ltd.) (12 g) were dispersed in water (900 g), the catechin powder (Present Invention 3) produced in Example 1 was added, followed by stirring at 40° C. for about 2 hours. Subsequently, the mixture was filtered through No. 2 filter paper, brought into contact with the activated carbon "KURARAY COAL GLC" (Kuraray Chemical Co., Ltd.) (40 g), and then subjected to filtration again through a membrane filter of 0.2 μm. Finally, water was distilled off at 40° C. and 0.0272 kg/cm$^2$, and the water content was then adjusted to obtain a purified green tea extract.

Analysis results of the thus-produced purified green tea extracts are presented in Table 3 and Table 4.

<Assessment of Purified Green Tea Extracts>

Visual Assessment of Stability

Each purified green tea extract was diluted with deionized water such that the concentration of catechins was lowered to 100 mg/mL. An assessment sample filled in a 50-mL vial was observed for the state of its contents on an illuminator, and the state of the contents was visually ranked.

TABLE 3

| | | Present Invention | | |
|---|---|---|---|---|
| | | 6 | 7 | 8 |
| Filtration conditions | Membrane pore size (μm) | 0.25 | 0.1 | 0.1 |
| | Molecular weight cutoff | — | — | — |
| | Material | Polyolefin | Polyethylene | PVDF |
| Solid green tea extract (g) | | 200 | 200 | 200 |
| Ethanol (g) | | 544 | 544 | 544 |
| Water (g) | | 256 | 256 | 256 |
| Activated carbon (g) | | 32 | 32 | 32 |
| Acid clay (g) | | 37.5 | 37.5 | 37.5 |
| Ethanol/water (weight ratio) | | 68/32 | 68/32 | 68/32 |
| Dissolution temperature (° C.) | | 40 | 40 | 40 |
| Non-polymer catechins/caffeine after processing (weight ratio) | | 14 | 14 | 13 |
| Content of gallates in non-polymer catechins after processing (wt %) | | 52 | 52 | 52 |
| Content of gallocatechins in non-polymer catechins after processing (wt %) | | 77 | 77 | 77 |
| Concentration of non-polymer catechins in solids after processing (wt %) | | 43 | 43 | 43 |
| Filtration time[4] (hr) | | 1.0 | 0.7 | 0.7 |
| Total processing time (hr) | | 30 | 28 | 29 |
| Yield of non-polymer catechins (through the purification step only) (%) | | 75 | 77 | 78 |
| Yield of non-polymer catechins (through the extraction and purification steps) (%) | | 75 | 75 | 76 |
| Assessment of purified products | | Caffeine content was lowered, color was good, and stability was visually good. | Caffeine content was lowered, color was good, and stability was visually good. | Caffeine content was lowered, color was good, and stability was visually good. |

[4] 3.6 m$^3$ slurry, 6 m$^2$

TABLE 4

| | Comparative Examples | | | |
|---|---|---|---|---|
| | 6 | 7 | 8 | 9 |
| Filtration conditions — Membrane pore size (μm) | 5.0 | 0.1 | — | — |
| Molecular weight cutoff | — | — | 13,000 | — |
| Material | Stainless steel filter | Ceramics | PAN | PVDF |
| Solid green tea extract (g) | 200 | 200 | 200 | 200 |
| Ethanol (g) | 544 | 544 | 544 | 0 |
| Water (g) | 256 | 256 | 256 | 900 |
| Activated carbon (g) | 32 | 32 | 32 | 40 |
| Acid clay (g) | 37.5 | 37.5 | 37.5 | 200 |
| Ethanol/water (weight ratio) | 68/32 | 68/32 | 68/32 | 0/100 |
| Dissolution temperature (° C.) | 40 | 40 | 40 | 40 |
| Non-polymer catechins/caffeine after processing (weight ratio) | 14 | 14 | 14 | 43 |
| Content of gallates in non-polymer catechins after processing (wt %) | 52 | 52 | 52 | 48 |
| Content of gallocatechins in non-polymer catechins after processing (wt %) | 77 | 77 | 77 | 80 |
| Concentration of non-polymer catechins in solids after processing (wt %) | 44 | 43 | 45 | 34 |
| Filtration time[2] (hr) | 5.1 | 0.6 | 0.6 | 2.0 |
| Total processing time (hr) | 31 | 42 | 43 | 31 |
| Yield of non-polymer catechins (through the purification step only) (%) | 69 | 76 | 77 | 76 |
| Yield of non-polymer catechins (through the extraction and purification steps) (%) | 69 | 73 | 72 | 74 |
| Assessment of purified products | Caffeine content was lowered, color was good, and stability was visually good. | Caffeine content was lowered, color was good, and stability was visually good. | Caffeine content was lowered, color was good, and stability was visually good. | Color deteriorated, and precipitates occurred. |

The purified green extracts according to the present invention were all low in caffeine content, good in color, and also visually good in stability. In the case of the filtration through the membrane having the pore size of 1 μm or greater (Comparative Example 6), on the other hand, the filtration time was long upon production of the purified green tea extract and the yield of non-polymer catechins through the entire steps was inferior. In each of the cases of the filtration making use of the ceramics (Comparative Example 7) and the filtration through the membrane having the pore size of 13,000 in terms of molecular weight cutoff (Comparative Example 8), the content of non-polymer catechins was low, the processing time was long, and further, the yield of non-polymer catechins through the entire steps was inferior. In Comparative Example 9 in which no organic solvent was used, the color deteriorated and the occurrence of precipitates was observed.

Example 3

Production of Purified Green Tea Extracts

Present Invention 9

After the acid clay "MIZUKA ACE #600" (Mizusawa Chemical Industries, Ltd.) (100 g) and the filter aid "SOLCA FLOC" (Imazu Chemical Co., Ltd.) (12 g) were dispersed in a 92 wt % aqueous solution of ethanol (800 g), the catechin powder (Present Invention 1) produced in Example 1 was added, followed by stirring at 40° C. for about 2 hours. Subsequently, the mixture was filtered through No. 2 filter paper, brought into contact with the activated carbon "KURARAY COAL GLC" (Kuraray Chemical Co., Ltd.) (30 g), and then subjected to filtration again through a membrane filter of 0.2 μm. Finally, ethanol was distilled off at 40° C. and 0.0272 kg/cm$^2$, and the water content was then adjusted to obtain a purified green tea extract having a solid content of 24 wt %.

Present Invention 10

A purified green tea extract was obtained in a similar manner as in Present Invention 9 except that the catechin powder (Present Invention 2) produced in Example 1 was added.

Present Invention 11

A purified green tea extract was obtained in a similar manner as in Present Invention 9 except that the catechin powder (Present Invention 3) produced in Example 1 was added.

Comparative Example 10

Green tea leaves (200 g) were extracted for 30 minutes with deionized water (3 L) of 90° C. The extract was coarsely filtered through a 200-mesh stainless steel filter. The filtrate was subjected to centrifugal separation (5,000 r/min) at 25° C. for 30 minutes so that the filtrate was separated into green tea leaves and a green tea extract by solid-liquid separation. After the green tea extract (the content of non-polymer catechins: 1.0 wt %, turbidity: 0.29) was allowed to pass at 30° C. through a stainless steel filter of 5 μm, the passed solution was subjected to primary concentration under reduced pressure until the solid concentration arose to 40 wt %. Freeze drying was then conducted to obtain a catechin powder. Subsequently, a purified green tea extract was obtained in a similar manner as in Present Invention 9 except for the addition of the catechin powder.

Comparative Example 11

A catechin powder was produced in a similar manner as in Comparative Example 10 except for the passage through a ceramic membrane of 0.1 μm ("CEFILT", NGK Industries, Ltd.) in place of the stainless steel filter of 5 μm. Subsequently, a purified green tea extract was obtained in a similar manner as in Present Invention 9 except for the addition of the catechin powder.

Comparative Example 12

A purified green tea extract was obtained in a similar manner as in Present Invention 9 except that the catechin powder produced in Comparative Example 4 was added.

Comparative Example 13

After the acid clay "MIZUKA ACE #600" (Mizusawa Chemical Industries, Ltd.) (200 g) and the filter aid "SOLCA FLOC" (Imazu Chemical Co., Ltd.) (12 g) were dispersed in water (900 g), the catechin powder produced in Example 3 was added, followed by stirring at 40° C. for about 2 hours. Subsequently, the mixture was filtered through No. 2 filter paper, brought into contact with the activated carbon "KURARAY COAL GLC" (Kuraray Chemical Co., Ltd.) (40 g), and then subjected to filtration again through a membrane filter of 0.2 μm. Finally, water was distilled off at 40° C. and 0.0272 kg/cm$^2$, and the water content was then adjusted to obtain a product.

Analysis results of the thus-produced purified green tea extracts are presented in Table 5 and Table 6.

<Assessment of Purified Green Tea Extracts>
Measurement of Turbidity

Using a digital turbidimeter ("TN-100", MK Scientific, Inc.), each purified green tea extract was diluted with deionized water in a cell to provide an aqueous solution containing non-polymer catechins at a concentration of 20 wt %, and was then measured.

TABLE 5

| | | Present Invention | | |
|---|---|---|---|---|
| | | 9 | 10 | 11 |
| Filtration conditions | Membrane pore size (μm) | 0.25 | 0.1 | 0.1 |
| | Molecular weight cutoff | — | — | — |
| | Material | Polyolefin | Polyethylene | PVDF |
| Solid green tea extract (g) | | 200 | 200 | 200 |
| Ethanol (g) | | 736 | 736 | 736 |
| Water (g) | | 64 | 64 | 64 |
| Activated carbon (g) | | 30 | 30 | 30 |
| Acid clay (g) | | 100 | 100 | 100 |
| Ethanol/water (weight ratio) | | 92/8 | 92/8 | 92/8 |
| Dissolution temperature (° C.) | | 25 | 25 | 25 |
| Non-polymer catechins/caffeine after processing (weight ratio) | | 72 | 61 | 52 |
| Content of gallates in non-polymer catechins after processing (wt %) | | 52 | 51 | 52 |
| Content of gallocatechins in non-polymer catechins after processing (wt %) | | 76 | 76 | 76 |
| Concentration of non-polymer catechins in solids after processing (wt %) | | 69 | 68 | 69 |
| Turbidity of purified product (NTU) | | 13 | 9 | 9 |
| Total processing time (hr) | | 32 | 31 | 32 |
| Yield of non-polymer catechins (through the purification step only) (%) | | 63 | 64 | 65 |
| Yield of non-polymer catechins (through the extraction and purification steps) (%) | | 63 | 63 | 64 |
| Assessment of purified products | | Caffeine content was lowered, color was good, and stability was visually good. | Caffeine content was lowered, color was good, and stability was visually good. | Caffeine content was lowered, color was good, and stability was visually good. |

TABLE 6

| | | Comparative Examples | | | |
|---|---|---|---|---|---|
| | | 10 | 11 | 12 | 13 |
| Filtration conditions | Membrane pore size (μm) | 5.0 | 0.1 | — | — |
| | Molecular weight cutoff | — | — | 13,000 | — |
| | Material | Stainless steel filter | Ceramics | PAN | PVDF |
| Solid green tea extract (g) | | 200 | 200 | 200 | 200 |
| Ethanol (g) | | 736 | 736 | 736 | 0 |
| Water (g) | | 64 | 64 | 64 | 900 |
| Activated carbon (g) | | 30 | 30 | 30 | 40 |
| Acid clay (g) | | 100 | 100 | 100 | 200 |
| Ethanol/water (weight ratio) | | 92/8 | 92/8 | 92/8 | 0/100 |
| Dissolution temperature (° C.) | | 25 | 25 | 25 | 25 |
| Non-polymer catechins/caffeine after processing (weight ratio) | | 92 | 56 | 60 | 43 |
| Content of gallates in non-polymer catechins after processing (wt %) | | 52 | 52 | 52 | 48 |
| Content of gallocatechins in non-polymer catechins after processing (wt %) | | 76 | 76 | 76 | 80 |
| Concentration of non-polymer catechins in solids after processing (wt %) | | 69 | 69 | 67 | 34 |
| Turbidity of purified products (NTU) | | 717 | 7 | 2 | 25 |
| Total processing time (hr) | | 29 | 44 | 45 | 32 |

TABLE 6-continued

|  | Comparative Examples | | | |
|---|---|---|---|---|
|  | 10 | 11 | 12 | 13 |
| Yield of non-polymer catechins (through the purification step only) (%) | 55 | 65 | 65 | 76 |
| Yield of non-polymer catechins (through the extraction and purification steps) (%) | 55 | 62 | 60 | 74 |
| Assessment of purified products | Color was poor, and precipitates occurred. | Caffeine content was lowered, color was good, and stability was visually good. | Caffeine content was lowered, color was good, and stability was visually good. | Color was poor, and precipitates occurred. |

The purified green extracts according to the present invention were all low in caffeine content, good in color, and also visually good in stability. In the case of the filtration through the membrane having the pore size of 1 μm or greater (Comparative Example 10), on the other hand, the color was poor, the turbidity was high, and the suspension of flocculates was observed. In each of the cases of the filtration making use of the ceramics (Comparative Example 11) and the filtration through the membrane having the pore size of 13,000 in terms of molecular weight cutoff (Comparative Example 12), the content of non-polymer catechins was low, the processing time was long, and further, the yield of non-polymer catechins through the entire steps was inferior. In Comparative Example 13 in which no organic solvent was used, the color deteriorated and the occurrence of precipitates was observed.

Example 4

Beverages were prepared by adding the ingredients for packaged beverages, said ingredients being described in Table 7, to the respective purified green tea extracts produced in Example 3 and then adding deionized water to bring the total amounts to 100, respectively. The beverages were subjected to sterilization processing and hot-pack filling under the Food Sanitation Act to obtain packaged non-tea beverages.

Five trained assessors ingested the thus-produced, packaged non-tea beverages (500 mL, each) once per beverage, and assessed the packaged non-tea beverages by ranking their mouth refreshment shortly after drinking in accordance with the following standards. The temperatures of the beverages at the time of their drinking were set around room temperature.

Ranking score 4: Good mouth refreshment
3: Slightly better mouth refreshment
2: Slightly poorer mouth refreshment
1: Poor mouth refreshment The results of the assessment by the trained assessors are presented in terms of average scores in Table 7.

TABLE 7

| | | Present Invention | | | Comparative Examples | |
|---|---|---|---|---|---|---|
| Compositions (weight parts) | | 12 | 13 | 14 | 14 | 15 |
| Purified green tea extracts | Product of Present Invention 9 | 1.00 | — | — | — | — |
| | Product of Present Invention 10 | — | 1.00 | — | — | — |
| | Product of Present Invention 11 | — | — | 1.00 | — | — |
| | Product of Comparative Example 10 | — | — | — | 1.00 | — |
| | Product of Comparative Example 11 | — | — | — | — | 1.00 |
| Antioxidant (L-ascorbic acid) | | 0.03 | 0.03 | 0.03 | 0.03 | 0.03 |
| Sour seasoning (citric acid) | | 0.30 | 0.30 | 0.30 | 0.30 | 0.30 |
| Sweetener (erythritol) | | 5.00 | 5.00 | 5.00 | 5.00 | 5.00 |
| Fruit juice (grape fruit juice) | | 0.05 | 0.05 | 0.05 | 0.05 | 0.05 |
| Deionized water | | Balance | Balance | Balance | Balance | Balance |
| Total amount | | 100 | 100 | 100 | 100 | 100 |
| pH at the time of drinking, 30° C. | | 3.5 | 3.4 | 3.5 | 3.5 | 3.6 |
| Non-polymer catechins (wt %) | | 0.22 | 0.22 | 0.22 | 0.22 | 0.22 |
| Non-polymer catechins/caffeine (weight ratio) | | 29.6 | 30.4 | 32.4 | 27.2 | 42.6 |
| Mouth refreshment shortly after drinking | | 4 | 3 | 4 | 1 | 4 |

The packaged beverages according to the present invention were all good in mouth refreshment shortly after drinking, and no occurrence of turbidity was observed with time in them. In contrast, the packaged beverage of Comparative Example 14 was poor in mouth refreshment shortly after drinking. The packaged beverage of Comparative Example 15 was poor in color and the occurrence of precipitates was observed in it, although it was good in mouth refreshment shortly after drinking.

Example 5

In a similar manner as in Example 1, Present Invention 2, an aqueous solution of green tea extract is subjected to microfiltration. The resulting filtrate is then concentrated under reduced pressure to obtain a green tea extract having a solid concentration of 40%.

The turbidity of an aqueous solution prepared by adjusting the concentration of non-polymer catechins to 1 wt % shortly after the concentration is 0.03, and is still 0.04 even 3 days later. Three (3) days later, the percent remainder of catechins was 97%, the biological stability is ranked "A", and the color and stability are visually good.

Example 6

Green tea leaves (200 g) are extracted for 30 minutes with deionized water (3 L) of 90° C. The extract is filtered through a 200-mesh stainless steel filter. The filtrate is subjected to further filtration through a 5-μm stainless steel filter. After the resulting green tea extract (the content of non-polymer catechins: 1 wt %) is allowed to pass at 30° C. through a polyolefin membrane of 0.25 μm (Asahi Kasei Chemicals Corporation, "PMP-003"), the passed solution is subjected to primary concentration under reduced pressure until the solid concentration arose to 40 wt %. Freeze drying is then conducted to obtain a catechin powder. The green tea extract is good in color, and is also good visually in stability.

Example 7

(1) Hot water of 84° C. (90 kg) was added to green tea leaves (6,000 g), and subsequent to extraction for 60 minutes, the mixture was coarsely filtered through a 200-mesh stainless steel filter. The coarse filtrate was subjected to centrifugal separation (5,000 r/min) at 25° C. for 30 minutes so that the coarse filtrate was separated into green tea leaves and a green tea extract by solid-liquid separation. The green tea extract (the content of non-polymer catechins: 1.0 wt %, turbidity: 0.35) was then allowed to pass at 30° C. through a polyvinylidene difluoride (PDVF) membrane of 0.1 μm (Asahi Kasei Chemicals Corporation, "USP-143"), so that "a green tea extract" (65 kg, pH 5.6) was obtained. (the concentration of non-polymer catechins in the green-tea extract: 0.9 wt %, the content of gallates in the green tea extract: 52.0 wt %)

The green tea extract was set at 25° C., tannase ("TANNASE KTFH", product of Kikkoman Corporation) was added at a concentration of 200 ppm to the green tea extract, and the solution was then maintained for 130 minutes. When the content of gallates had decreased to 40.1 wt %, the solution was heated to 90° C. to inactivate the enzyme so that the reaction was terminated (pH 5.0). Using a reverse osmosis membrane ("NTR-759HR", product of Nitto Denko Corporation), the reaction mixture was concentrated to Brix concentration of 25 to obtain a liquid "concentrate of a tannase-treated green tea extract" (8 kg). The contents of non-polymer catechins and gallates in the green tea extract so obtained were 6.8 wt % and 40.1 wt %, respectively, and the pH of an aqueous solution with the green tea extract dissolved at a solid concentration of 2 wt % therein was 5.0.

(2) Further, the thus-obtained concentrate (4.5 kg) was spray-dried to obtain a powdery "green tea extract of the tannase-treated tea extract" (400 g). The contents of non-polymer catechins and gallates in the green tea extract so obtained were 34.0 wt % and 40.1 wt %, respectively, and the pH of an aqueous solution with the green tea extract dissolved at a solid concentration of 2 wt % therein was 5.0.

(3) Using the green tea extract so obtained, similar purification processing as in Example 3, Present Invention 9 was conducted to obtain a purified green tea extract with a good color and reduced bitterness. Turbidity was not observed at all.

Turbidity after processing: 9
Non-polymer catechins/caffeine weight ratio after processing: 70
Content of gallates after processing: 40.2 wt %

(4) Using the purified green tea extract so obtained, a packaged beverage was obtained in a similar manner as in Example 4, Present Invention Product 13. Even when stored for a long time, that beverage remained unchanged in external appearance and was reduced in bitterness.

The invention claimed is:

1. A process for producing a purified product of green tea extract, which comprises:
   a primary step comprising:
     subjecting an aqueous solution of green tea extract to solid-liquid separation by filtration using a membrane having a pore size ranging from 1 to 30 μm and/or centrifugal separation to obtain another aqueous solution of green tea extract, controlling a turbidity of said another aqueous solution to a range of from 0.2 to 2.0 as measured with a concentration of non-polymer catechins therein adjusted to 1 wt %, and
   a second step comprising:
     allowing said another aqueous solution of green tea extract to pass through a spiral polymer membrane or a hollow fiber polymer membrane having a membrane pore size of from 0.05 to 0.8 μm such that said turbidity of said another aqueous solution of green tea extract is reduced to lower than 0.2 as measured with a concentration of non-polymer catechins therein adjusted to 1 wt %,
   wherein said polymer membrane is selected from a polymer hydrocarbon membrane or polymer fluorocarbon membrane.

2. The production process according to claim 1, wherein said polymer membrane is a microfiltration membrane.

3. The production process according to claim 1, further comprising concentrating or drying said solution subsequent to said passage through said polymer membrane in the second step.

4. The production process according to claim 1, wherein said aqueous solution of green tea extract has been obtained by treating said green tea extract in the primary step with tannase.

5. The process of claim 4, wherein treating with tannase is conducted at a pH from 3 to 6.

6. The process of claim 1, wherein said another aqueous solution of green tea extract prior to the passage of the polymer membrane in the second step has a non-polymer catechin content of 25-90 wt. %, on a dry weight basis.

7. The process of claim 6, wherein said non-polymer catechins have a content of gallates in a range of from 10 to 70 wt %.

8. The process of claim 1, wherein said purified product of a green tea extract contains 35 to 90 wt. % of non-polymer catechins based on its solid content and a caffeine at a non-polymer/caffeine weight ratio of from 4 to 200.

9. The process of claim 1, further comprising dispersing said purified product of green tea extract in a mixed solution of ethanol and water, at a mixing ratio of ethanol to water of 60/40 to 97/3, and then subjecting the resulting dispersion to treatment in contact with at least one of activated carbon and/or acid clay or activated clay.

10. A production process of a purified green tea extract, which comprises;
   a primary step comprising:
     subjecting an aqueous solution of green tea extract to solid-liquid separation by filtration using a membrane having a pore size ranging from 1 to 30 μm and/or centrifugal separation to obtain another aqueous solution of green tea extract, controlling a turbidity of said another aqueous solution to a range of from 0.2 to 2.0 as measured with a concentration of non-polymer catechins therein adjusted to 1 wt %; and
   a second step comprising:
     allowing said another aqueous solution of green tea extract to pass through a spiral polymer membrane or a hollow fiber polymer membrane having a membrane pore size of from 0.05 to 0.8 μm such that said turbidity of said another aqueous solution of green tea extract is reduced to lower than 0.2 as measured with a concentration of non-polymer catechins therein adjusted to 1 wt %, wherein said polymer membrane is selected from a polymer hydrocarbon membrane or polymer fluorocarbon membrane; and a third step comprising dispersing a green tea extract, which has been obtained by said second step, in a mixed solution of an organic solvent and water, and then subjecting the resulting dispersion to treatment in contact with activated carbon and/or acid clay or activated clay.

11. The production process according to claim 10, wherein a mixing weight ratio of said organic solvent to water is from 60/40 to 97/3.

12. The production process according to claim 10, wherein said organic solvent is ethanol.

13. A process for stabilizing an aqueous solution of green tea extract, which comprises subjecting said aqueous solution of green tea extract to solid-liquid separation by filtration using a membrane having a pore size ranging from 1 to 30 μm and/or centrifugal separation to obtain another aqueous solution of green tea extract, controlling a turbidity of said another aqueous solution to a range of from 0.2 to 2.0 as measured with a concentration of non-polymer catechins therein adjusted to 1 wt %, and then allowing said another aqueous solution of green tea extract to pass through a spiral polymer membrane or a hollow fiber polymer membrane having a membrane pore size of from 0.05 to 0.8 μm such that said turbidity of said another aqueous solution of green tea extract is reduced to lower than 0.2 as measured with a concentration of non-polymer catechins therein adjusted to 1 wt %, wherein said polymer membrane is selected from a polymer hydrocarbon membrane or polymer fluorocarbon membrane.

14. The stabilization process according to claim 13, wherein said aqueous solution of green tea extract has been obtained by treating said green tea extract with tannase.

* * * * *